(12) United States Patent
Inoue et al.

(10) Patent No.: US 8,957,838 B2
(45) Date of Patent: Feb. 17, 2015

(54) LIQUID CRYSTAL DISPLAY DEVICE AND TELEVISION RECEIVER

(75) Inventors: Naoto Inoue, Osaka (JP); Akira Tomiyoshi, Osaka (JP); Masayuki Takahashi, Osaka (JP); Osamu Teranuma, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 148 days.

(21) Appl. No.: 13/700,560

(22) PCT Filed: Jan. 25, 2011

(86) PCT No.: PCT/JP2011/051272
§ 371 (c)(1),
(2), (4) Date: Nov. 28, 2012

(87) PCT Pub. No.: WO2011/148663
PCT Pub. Date: Dec. 1, 2011

(65) Prior Publication Data
US 2013/0070004 A1 Mar. 21, 2013

(30) Foreign Application Priority Data
May 28, 2010 (JP) .................. 2010-122596

(51) Int. Cl.
*G09G 3/36* (2006.01)
*G09G 3/00* (2006.01)
(Continued)

(52) U.S. Cl.
CPC .................. *G09G 3/36* (2013.01); *G09G 3/003* (2013.01); *G09G 3/342* (2013.01);
(Continued)

(58) Field of Classification Search
CPC . G09G 3/003; G09G 3/342; G09G 2310/024; G09G 3/36; G09G 2320/0209; G09G 2320/0633; G09G 2320/064; H04N 13/0438; H04N 13/0452; G02B 27/2264

USPC .............. 345/204–211, 690, 6, 87–102, 419; 348/51–59; 349/15
See application file for complete search history.

(56) References Cited

U.S. PATENT DOCUMENTS

2006/0145978 A1* 7/2006 Takatori et al. ................. 345/87
2007/0242068 A1* 10/2007 Han et al. ...................... 345/427
(Continued)

FOREIGN PATENT DOCUMENTS

CN 101123734 A 2/2008
JP 2006-235461 9/2006
(Continued)

OTHER PUBLICATIONS

International Search Report for PCT/JP2011/051272, mailed Apr. 26, 2011.

*Primary Examiner* — Hong Zhou
(74) *Attorney, Agent, or Firm* — Nixon & Vanderhye P.C.

(57) ABSTRACT

Disclosed is a liquid crystal display device wherein display performance of a two-dimensional image and that of a three-dimensional image are both improved. The liquid crystal display device is provided with: a liquid crystal display panel, which displays the two-dimensional image and the three-dimensional image by selectively switching the images; and a backlight, which supplies light to the liquid crystal display panel. The backlight includes an illuminating region, which is scan-lighted corresponding to scanning of the liquid crystal display panel, and the scanning frequencies of the illuminating region at the time of displaying the two-dimensional image and the three-dimensional image on the liquid crystal display panel are different from each other.

16 Claims, 10 Drawing Sheets

(51) Int. Cl.
 *G09G 3/34* (2006.01)
 *H04N 13/04* (2006.01)
 *G02B 27/22* (2006.01)

(52) U.S. Cl.
 CPC ....... *H04N 13/0438* (2013.01); *G02B 27/2264* (2013.01); *G09G 2310/024* (2013.01); *H04N 13/0452* (2013.01); *G09G 2320/0209* (2013.01); *G09G 2320/0633* (2013.01); *G09G 2320/064* (2013.01)
 USPC ............................................ 345/87; 345/102

(56) References Cited

U.S. PATENT DOCUMENTS

2008/0252578 A1* 10/2008 Kim et al. ........................ 345/87
2008/0297671 A1   12/2008 Cha et al.
2008/0316596 A1*  12/2008 Cha et al. ...................... 359/463
2009/0146942 A1*   6/2009 Lee et al. ...................... 345/102
2010/0225747 A1*   9/2010 Chen et al. ..................... 348/51
2010/0231698 A1*   9/2010 Nakahata et al. ............... 348/56
2011/0157332 A1*   6/2011 Kim et al. ...................... 348/56
2013/0286000 A1   10/2013 Han et al.

FOREIGN PATENT DOCUMENTS

| | | |
|---|---|---|
| JP | 2006-253777 | 9/2006 |
| JP | 2009-25436 | 2/2009 |
| JP | 2010-66749 | 3/2010 |
| JP | 2010-217311 | 9/2010 |

* cited by examiner

LIQUID CRYSTAL DISPLAY DEVICE AND TELEVISION RECEIVER

This application is the U.S. national phase of International Application No. PCT/JP2011/051272, filed 25 Jan. 2011, which designated the U.S. and claims priority to JP Application No. 2010-122596, filed 28 May 2010, the entire contents of each of which are hereby incorporated by reference.

TECHNICAL FIELD

The present invention relates to liquid crystal display devices and television receivers, and more particularly to liquid crystal display devices capable of displaying three-dimensional video and television receivers provided with such liquid crystal display devices.

BACKGROUND ART

Recent years have been witnessing the development of display devices that allow their users to perceive a stereoscopic image (video) by displaying a three-dimensional image (three-dimensional video) taken by exploiting binocular parallax (see, for example, Patent Document 1 listed below).

Patent Document 1 discloses a stereoscopic image display device that employs a pair of liquid crystal shutter glasses (active shutter glasses), that is, one that adopts the so-called frame-sequential method. This stereoscopic image display device displays images for the right and left eyes alternately. While the right-eye image is being displayed, the right eye-side shutter of the liquid crystal shutter glasses alone remains released; while the left-eye image is being displayed, the left eye-side shutter of the liquid crystal shutter glasses alone is remains released. This permits the right-eye image to be shown to the right eye alone and the left-eye image to be shown to the left eye alone, and thereby allows the user to perceive a stereoscopic image.

Such display of three-dimensional video by the frame-sequential method can be implemented in liquid crystal display devices incorporating liquid crystal display panels, and recent years have been seeing the introduction of television receivers that incorporate liquid crystal display devices capable of displaying three-dimensional video.

Seeing, however, that, of the currently available video content, overwhelmingly most is two-dimensional, taken from a single viewpoint, and only a fraction is three-dimensional, it is preferable that liquid crystal display devices (television receivers) as mentioned above be configured so as to be capable of displaying both two-dimensional and three-dimensional video.

LIST OF CITATIONS

Patent Literature

Patent Document 1: Japanese Patent Application Publication No. 2006-253777

SUMMARY OF INVENTION

Technical Problem

Inconveniently, however, trying to configure a liquid crystal display device incorporating a liquid crystal display panel to be capable of displaying both two-dimensional and three-dimensional video encounters the difficulty obtaining satisfactory display performance with both. That is, a configuration capable of displaying both two-dimensional and three-dimensional video suffers a drop in display performance with at least either.

Devised to overcome the problems mentioned above, the present invention has, as one object, to provide a liquid crystal display device that offers improved display performance in the display of both two-dimensional and three-dimensional video, and to provide a television receiver that is provided with such a liquid crystal display device.

Solution to Problem

To achieve the above object, according to one aspect of the invention, a liquid crystal display device is provided with: a liquid crystal display panel which switches between two-dimensional video and three-dimensional video to selectively display one of them; and an illuminating device which supplies light to the liquid crystal display panel. The illuminating device includes illumination regions that are scan-lit as the liquid crystal display panel is scanned, and the scan frequency of the illumination regions differs between when the two-dimensional video is displayed on the liquid crystal display panel and when the three-dimensional video is displayed there.

With this liquid crystal display device according to the first aspect, by, as described above, adopting a configuration where the scanning frequency of the illumination regions in the illuminating device differs between when the two-dimensional video is displayed and when the three-dimensional video is displayed on the liquid crystal display panel, it is possible to scan-light the illumination regions at scanning frequencies fit for display of two-dimensional and three-dimensional video respectively. It is thus possible to scan-light the illumination regions at a scanning frequency fit for two-dimensional video when two-dimensional video is displayed, and to scan-light the illumination regions at a scanning frequency fit for three-dimensional video when three-dimensional video is displayed; it is thereby possible to suppress a drop in display performance in either case.

In the above-described liquid crystal display device according to the first aspect, preferably, the scanning frequency of the liquid crystal display panel differs between when the two-dimensional video is displayed and when the three-dimensional video is displayed. With this configuration, it is possible to scan the liquid crystal display panel at a scanning frequency fit for display of two-dimensional video when two-dimensional video is displayed, and to scan the liquid crystal display panel at a scanning frequency fit for display of three-dimensional video when three-dimensional video is displayed. It is thereby possible to improve display performance in either case.

In the above-described liquid crystal display device according to the first aspect, preferably, the lighting end time point in the scan-lighting of the illuminating device differs between when the two-dimensional video is displayed and when the three-dimensional video is displayed. With this configuration, it is easy to scan-light the illuminating device in ways fit for display of two-dimensional and three-dimensional video respectively.

In the above-described liquid crystal display device according to the first aspect, preferably, the illuminating device includes a plurality of light sources, and the lighting of the plurality of light sources is controlled individually and thereby the illumination regions are scan-lit as the liquid crystal display panel is scanned. With this configuration, it is easy to scan-light the illumination regions of the illuminating device. In addition, it is easy to adopt a configuration where the scanning frequency of the illumination regions differs between when two-dimensional video is displayed and when three-dimensional video is displayed on the liquid crystal display panel.

In this case, preferably, the light sources are light emitting diodes. With this configuration, since light emitting diodes have a fast light emission response and a fast light extinction response, by scan-lighting (turning on and off) the illuminating device as video is progressively displayed on the liquid crystal display panel, it is possible to effectively improve display performance.

In the above-described configuration where the light sources are light emitting diodes, preferably, the lighting of the light emitting diodes is controlled by pulse width modulation control, and the lighting width of the light emitting diodes differs between when the two-dimensional video is displayed on the liquid crystal display panel and when the three-dimensional video is displayed there.

In the above-described configuration where the light sources are light emitting diodes, preferably, the lighting width of the light emitting diodes is shorter when the three-dimensional video is displayed than when the two-dimensional video is displayed, and the current value supplied to the light emitting diodes is greater when the three-dimensional video is displayed than when the two-dimensional video is displayed. With this configuration, it is possible to suppress a drop in luminance in the display of both two-dimensional and three-dimensional video.

In the above-described liquid crystal display device according to the first aspect, preferably, in each case of when the two-dimensional video is displayed and when the three-dimensional video is displayed, the scanning frequency of the liquid crystal display panel and the scanning frequency of the illuminating device are equal. With this configuration, it is easy to set the scanning frequency of the illuminating device at scanning frequencies fit for display of two-dimensional and three-dimensional video respectively.

In the above-described liquid crystal display device according to the first aspect, preferably, the scanning frequency of the liquid crystal display panel and the scanning frequency of the illuminating device are both 120 Hz when the two-dimensional video is displayed and 240 Hz when the three-dimensional video is displayed.

In the above-described liquid crystal display device according to the first aspect, preferably, the illuminating device further includes a light guide member which guides light. In this case, preferably, the light guide member is divided into a plurality of regions at least the an up/down direction of the liquid crystal display panel. Dividing the light guide member into a plurality of regions in the up/down direction of the liquid crystal display panel in this way permits the illumination region of the illuminating device to be lit for each of the plurality of regions independently. It is thus easy to scan-light the illumination region in a manner coordinated with (in synchronism with) the scanning of the liquid crystal display panel.

In the above-described liquid crystal display device according to the first aspect, preferably, the illuminating device is extinguished during switching between display of the two-dimensional video and display of the three-dimensional video.

According to a second aspect of the invention, a television receiver is provided with the above-described liquid crystal display device according to the first aspect. With this configuration, it is possible to obtain a television receiver that offers improved display performance in the display of both two-dimensional and three-dimensional video.

Advantageous Effects of the Invention

As described above, according to the present invention, it is easy to obtain a liquid crystal display device that offers improved display performance in the display of both two-dimensional and three-dimensional video, and to obtain a television receiver that is provided with such a liquid crystal display device.

DESCRIPTION OF EMBODIMENTS

An embodiment of the present invention will be described below with reference to the accompanying drawings.

Figure 1:
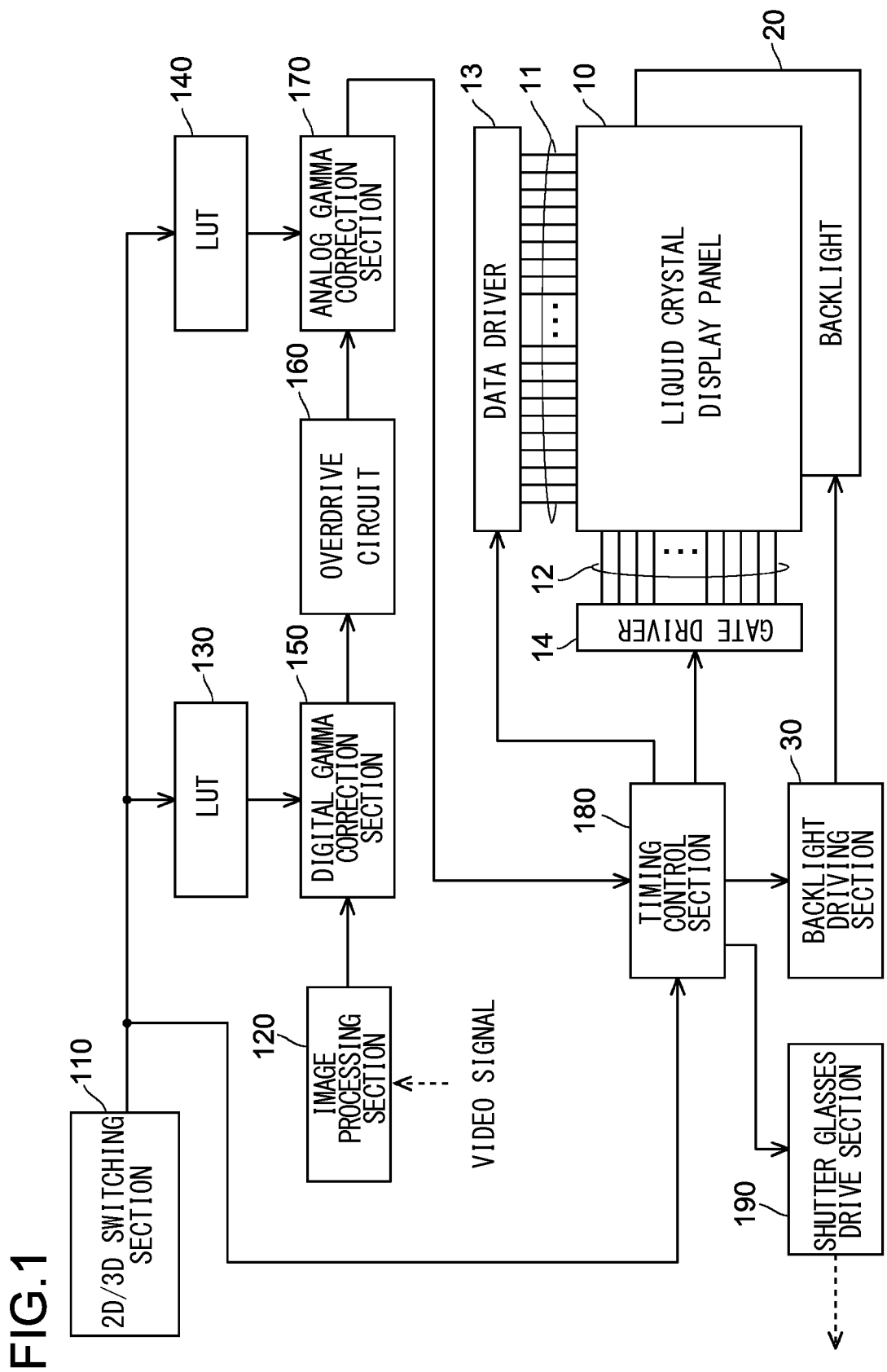
FIG. 1 is a block diagram showing the circuit configuration of a television receiver incorporating a liquid crystal display device according to one embodiment of the invention.
Figure 2:
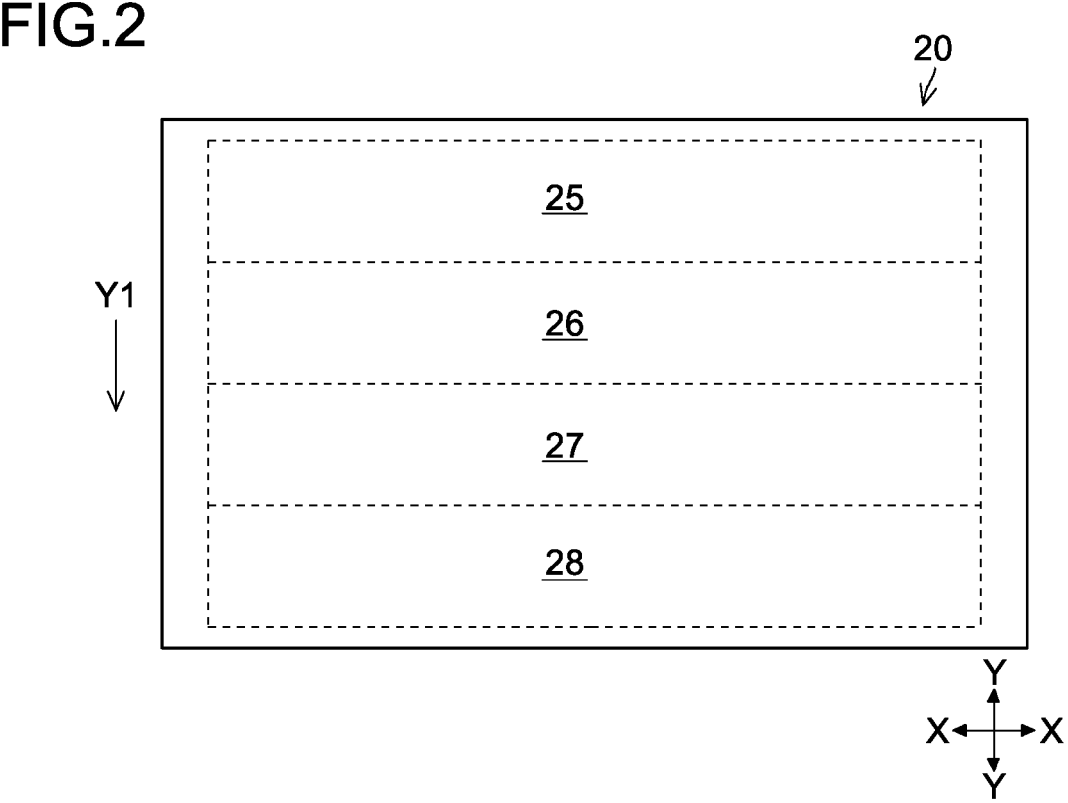
FIG. 2 is a plan view showing a backlight (its exterior) in a liquid crystal display device according to one embodiment of the invention.
Figure 3:
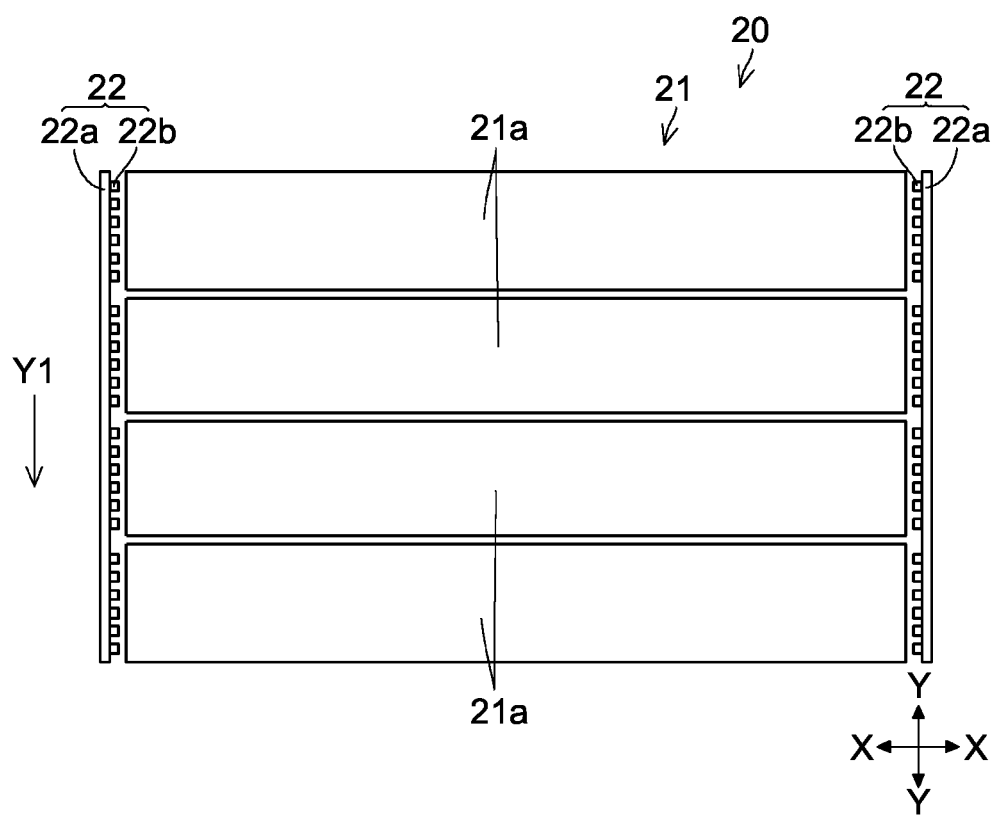
FIG. 3 is a plan view showing a backlight (its interior) in a liquid crystal display device according to one embodiment of the invention.
Figure 4:
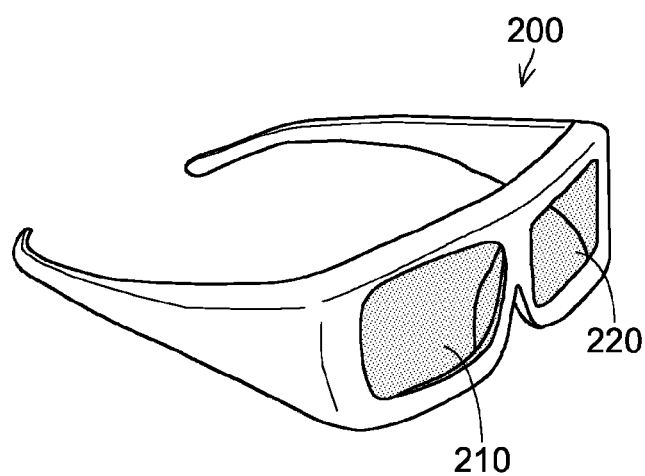
FIG. 4 is a perspective view showing an example of liquid crystal shutter glasses used with a television receiver according to one embodiment of the invention.

FIG. 1 is a block diagram showing the circuit configuration of a television receiver incorporating a liquid crystal display device according to one embodiment of the invention. FIGS. 2 and 3 are plan views showing a backlight in the liquid crystal display device embodying the invention. FIG. 4 is a perspective view showing an example of liquid crystal shutter glasses used with the television receiver embodying the invention. First, with reference to FIGS. 1 to 4, the liquid crystal display device embodying the invention and the television receiver incorporating it will be described.

As shown in FIG. 1, the liquid crystal display device (liquid crystal module) embodying the invention is provided with a liquid crystal display panel 10, a backlight (illuminating device) 20 which supplies the liquid crystal display panel 10 with light, and a backlight driving section 30 which drives the backlight 20.

The liquid crystal display panel 10 is composed of an active matrix substrate (not shown), which includes switching elements such as TFTs (thin film transistors), and a counter substrate (not shown), which is disposed opposite the active matrix substrate, bonded together with a sealing member (not shown). The gap between the two substrates is filled with liquid crystal (not shown). The active matrix substrate is, at its light entrance side, laid with a polarizing film, and the counter substrate is, at its light exit side, laid with a polarizing film.

On the active matrix substrate, a plurality of data lines 11 as video signal lines and a plurality of gate lines (scanning lines) 12 as scanning signal lines are arranged in a matrix-like formation, so that selecting a combination of one of the data lines 11 and one of the gate lines 12 results in selecting a pixel.

To the liquid crystal display panel 10, a gate driver 14 is connected across the gate lines 12, and a data driver 13 is connected across the data lines 11. The gate driver 14 supplies the gate lines 12 with pulse voltages according to a timing signal from the later-described timing control section 180, and turns on and off the gates of the TFTs of the liquid crystal display panel 10 sequentially from top down. The data driver 13 converts the data (video signal) it receives into voltage values according to a timing signal from the timing control section 180, and supplies drive voltages to individual pixels.

In the liquid crystal display panel 10, as described above, as pulse voltages for turning the TFTs on and off are applied to the gate lines 12, data (video signal) is written simultaneously in all the pixels in one horizontal row at a time. This operation is repeated as many times as the vertical number of pixels, and thereby video corresponding to one frame is completed. That is, the liquid crystal display panel 10 is scanned line-sequentially. The data (voltages) written in the pixels is stored in the capacitances within them, and those voltages are retained until the subsequent data is written.

Configured as described above, the liquid crystal display panel 10 displays video by exploiting variation in transmittance due to inclination of liquid crystal molecules. That is, it achieves video display based on a video signal by modulating the light (backlight) supplied from the backlight 20.

The backlight 20 is arranged directly under the liquid crystal display panel 10. As shown in FIG. 3, the backlight 20 is provided with LED (light emitting diode) modules 22 and a light guide member 21 which guides the light from the LED modules 22, and is configured as an edge-lit (side-lit) type.

The LED modules 22 are modules that emit light, and include mounting boards 22a and a plurality of LEDs (light emitting diodes) 22b which are mounted on the surface of the mounting boards 22a and which serve as light sources.

The mounting boards 22a are rectangular, plate-form boards, and have a plurality of electrodes (not shown) arranged on their mounting surface. On those electrodes, the LEDs 22b mentioned above are mounted. The backlight 20 embodying the invention includes two of the mounting boards 22a, which are arranged with their respective mounting surfaces facing each other.

The LEDs 22b, mounted on the electrodes (not shown) formed on the mounting surface of the mounting boards 22a, emit light by being supplied with electric current. The lighting of the plurality of LEDs 22b is controlled individually by pulse width modulation (PWM) control.

The light guide member 21 is formed of a transparent resin material such as acrylic resin or polycarbonate. The light guide member 21 includes, as seen in a plan view, a plurality of (for example, four) approximately rectangular, plate-form light guide segments 21a, and these light guide segments 21a are arranged side by side. Owing to the light guide member 21 being composed of a plurality of light guide segments 21a that are separate from one another, the light exit face (illumination region) of the backlight 20 (the light guide member 21) is divided into a plurality of regions. Specifically, the light guide member 21 is divided into multiple (for example, four) tiers in the up/down direction of the backlight 20 (that is, its shorter-side direction, the Y direction). Thus, as shown in FIG. 2, the illumination region of the backlight 20 is divided into four regions (a first illumination region 25, a second illumination region 26, a third illumination region 27, and a fourth illumination region 28) in the up/down direction (Y direction (the Y1 direction)).

As shown in FIG. 3, the plurality of LEDs 22b (the LED modules 22) mentioned above are arranged in two columns, one at each side of the backlight 20 in the left/right direction of the backlight 20 (the X direction), and are provided in groups, one for each of the plurality of light guide segments 21a. That is, the LEDs 22b (the LED modules 22) are arranged at opposite sides of the illumination region (the region corresponding to the display region of the liquid crystal display panel 10). The LEDs 22b (light sources) are not arranged in the region corresponding to the display region of the liquid crystal display panel 10, but are arranged near the edge, in the non-display region, of the liquid crystal display panel 10 (see FIG. 1).

As described above, in the backlight 20 embodying the invention, by lighting the LEDs 22b that shine light into the individual light guide segments 21a, the output of light can be controlled for each of the light guide segments 21a. By controlling the lighting of the illumination region (first to fourth illumination regions) (see FIG. 2) of the backlight 20 sequentially from top down, the illumination region can be scanned line-sequentially (scan-lit) as the liquid crystal display panel 10 can. That is, the backlight 20 allows backlight scanning.

The backlight 20 may be configured to further include any of a reflective sheet, a backlight chassis, a diffuser plate, a prism sheet, a lens sheet, etc.

The backlight 20 may even be of a type that uses no light guide member and that has LEDs arranged in a matrix simply in the left/right and up-down directions (the X and Y directions respectively), that is, that has a large number of LEDs arranged directly under the panel. With the backlight so configured (not shown), simply dividing the LEDs in the up/down direction (the Y direction) results in dividing the illumination region (into the first to fourth illumination regions), which can be scanned line-sequentially (scan-lit).

As shown in FIG. 1, the backlight driving section 30 drives the LEDs 22b (see FIG. 3) according to a timing signal from the timing control section 180.

Here, in this embodiment, the above-mentioned liquid crystal display device (television receiver) is configured to be capable of displaying both two-dimensional (2D) and three-dimensional (3D) video.

Display of three-dimensional video is achieved by a frame-sequential method using a pair of glasses having an active shutter mechanism (liquid crystal shutter glasses). Accordingly, when viewing three-dimensional video, the user wears a pair of liquid crystal shutter glasses 200 as shown in FIG. 4. On the other hand, when viewing two-dimensional video, the user does not wear the liquid crystal shutter glasses 200.

The liquid crystal shutter glasses 200 are, in parts thereof corresponding to lenses, provided with liquid crystal shutters 210 and 220. In the liquid crystal shutters 210 and 220, during viewing of three-dimensional video, the right eye-side and left eye-side liquid crystal shutters 210 and 220 are released alternately.

Moreover, during display of three-dimensional video, on the screen (the liquid crystal display panel 10) of the television receiver, right-eye and left-eye video are displayed alternately. While the right-eye video is being displayed, the right eye-side liquid crystal shutter 210 alone remains released; while the left-eye video is being displayed, the left eye-side liquid crystal shutter 220 alone remains released. Thus, the right-eye video is shown to the right eye alone and the left-eye video is shown to the left eye alone so as to allow the user to perceive a stereoscopic image (three-dimensional video).

As shown in FIG. 1, the television receiver according to the embodiment is, in addition to the liquid crystal display device described above, further provided with a 2D/3D switching section 110, an image processing section 120, look-up tables (LUT) 130 and 140, a digital gamma correction section 150, an overdrive circuit 160, an analog gamma correction section 170, a timing control section 180, and a shutter glasses driving section 190.

According to an instruction from the user, or automatically according to the content to be displayed, the 2D/3D switching section 110 switches between a 2D mode (two-dimensional video display mode) and a 3D mode (three-dimensional video display mode). Then, according to the mode to which switching has been made, the 2D/3D switching section 110 switches to the look-up table 130 for the digital gamma correction section 150 and the look-up table 140 for the analog gamma correction section 170, both corresponding to that mode. Furthermore, the 2D/3D switching section 110 switches the lighting timing of the backlight 20 (the lighting timing of the LEDs 22b) to that corresponding to the mode. That is, according to an instruction from the 2D/3D switching section 110, switching between two-dimensional video and three-dimensional video is made so that one of them is selectively displayed on the liquid crystal display device (the liquid crystal display panel 10). During switching between two-dimensional and three-dimensional video, the backlight 20 may be extinguished temporarily.

The image processing section 120 subjects the input video signal to image processing, such as color correction, hue correction, gradation correction, and noise reduction. The image processing section 120 also converts various kinds of 3D (three-dimensional video) video signals, such as frame-packing and side-by-side 3D signals, into a frame-sequential format. The input video signal is, for example, a reception signal from a tuner or a video signal from a VTR device or any type of player or the like. The video signal having undergone the image processing is output to the digital gamma correction section 150.

The digital gamma correction section 150 converts the input gradations according to the look-up table 130 and thereby modifies the gamma characteristic. The video signal having its gamma characteristic modified is output to the overdrive circuit 160.

The overdrive circuit 160 calculates an overdrive amount from the gradation value of the previous frame and the gradation value of the current frame, and outputs the result to the analog gamma correction section 170.

The analog gamma correction section 170 corrects the voltages corresponding to different gradations that are applied to the liquid crystal. It then outputs the corrected video signal to the timing control section 180.

The timing control section 180 controls the timing of the driving by the gate driver 14 and the data driver 13, and receives and delivers the video signal. It also controls the scanning (scan-lighting) of the backlight 20 and the timing of the driving of the liquid crystal shutter glasses 200 in the 3D mode (three-dimensional video display mode).

The shutter glasses driving section 190 outputs a drive signal to the liquid crystal shutter glasses 200 according to a timing signal from the timing control section 180. The shutter glasses driving section 190 is, for example, an infrared transmitter, and controls the timing of the driving of the liquid crystal shutter glasses 200 (the releasing and shutting of the liquid crystal shutters 210 and 220) by infrared rays.

Here, in this embodiment, when switching between the 2D and 3D modes takes place in response to an instruction from the 2D/3D switching section 110, the scanning frequency (driving frequency) of the liquid crystal display panel 10 is switched. That is, in the 2D mode for displaying two-dimensional video and the 3D mode for displaying three-dimensional video, video is written to the liquid crystal display panel 10 at different scanning frequencies.

Specifically, in the 2D mode for displaying two-dimensional video, the liquid crystal display panel 10 is driven at 120 Hz; by contrast, in the 3D mode for displaying three-dimensional video, the liquid crystal display panel 10 is driven at 240 Hz. That is, the scanning frequency in the 2D mode is 120 Hz (120 frames per second), and the scanning frequency in the 3D mode is 240 Hz (240 frames per second). Television video as transmitted from a broadcast station generally has 60 frames per second, and thus the 2D mode implicates double-speed driving. In the 2D mode, video display at the rate of 120 frames per second is achieved by displaying, between every two of the 60 frames per second of real video, an interpolating frame synthesized by a video processor (the image processing section 120) or the like.

On the other hand, in the 3D mode for displaying three-dimensional video, right-eye video and left-eye video are displayed alternately. Meanwhile, each frame is displayed twice. Specifically, right-eye video is written in 1/240 seconds, then the same video is written in the subsequent 1/240 seconds, and thereby the video is retained. Likewise, left-eye video is written in 1/240 seconds, then the same video is written in the subsequent 1/240 seconds, and thereby the video is retained.

In this embodiment, the scanning frequency of the backlight 20 differs in the 2D and 3D modes. When switching between the 2D and 3D modes takes place, the scanning frequency of the backlight 20 is switched to one fit for the mode in effect. For example, in the 2D mode, the backlight 20 is scan-lit at 120 Hz, that is, at the same frequency as the scanning frequency of the liquid crystal display panel 10 in the 2D mode; in the 3D mode, the backlight 20 is scan-lit at 240 Hz, that is, at the same frequency as the scanning frequency of the liquid crystal display panel 10 in the 3D mode. In either mode, the lighting cycle of the backlight 20 (the backlight cycle) is, for example, 120 Hz.

In this embodiment, the lighting width of the backlight 20 (the lighting width of the LEDs 22b under PWM control) is longer in the 2D mode than in the 3D mode. To suppress a drop in luminance in the 3D mode, accordingly, the value of the current supplied to the LEDs 22b is higher in the 3D mode than in the 2D mode.

FIGS. 5 to 10 are diagrams illustrating the control operation of the liquid crystal display device (television receiver) embodying the invention. In FIGS. 5 to 10, the time axis runs along the horizontal axis. In FIGS. 5 to 8, hatched parts of the backlight indicate the individual illumination regions 25 to 28 of the backlight 20 being lit (the lighting periods). Next, with reference to FIGS. 1, 3, and 5 to 10, the control operation (control method) of the liquid crystal display device (television receiver) embodying the invention will be described.

As described above, the liquid crystal display device (television receiver) according to the embodiment is configured to operate in the 2D mode for displaying two-dimensional video and the 3D mode for displaying three-dimensional video. For example, when the user presses a 2D/3D switch button (not shown) provided on a remote control unit or the like, switching between two-dimensional (2D) video and three-dimensional (3D) video is made so that one of them is selectively displayed on the liquid crystal display panel 10.

When the 3D mode is selected, according to an instruction from the 2D/3D switching section 110 shown in FIG. 1, the scanning frequency of the liquid crystal display panel 10 is set at 240 Hz, and the liquid crystal display panel 10 is driven at 240 Hz. Simultaneously, the timing control section 180 controls the backlight driving section 30 such that the backlight driving section 30 scan-lights the backlight 20 at a scanning frequency of 240 Hz.

Figure 5:
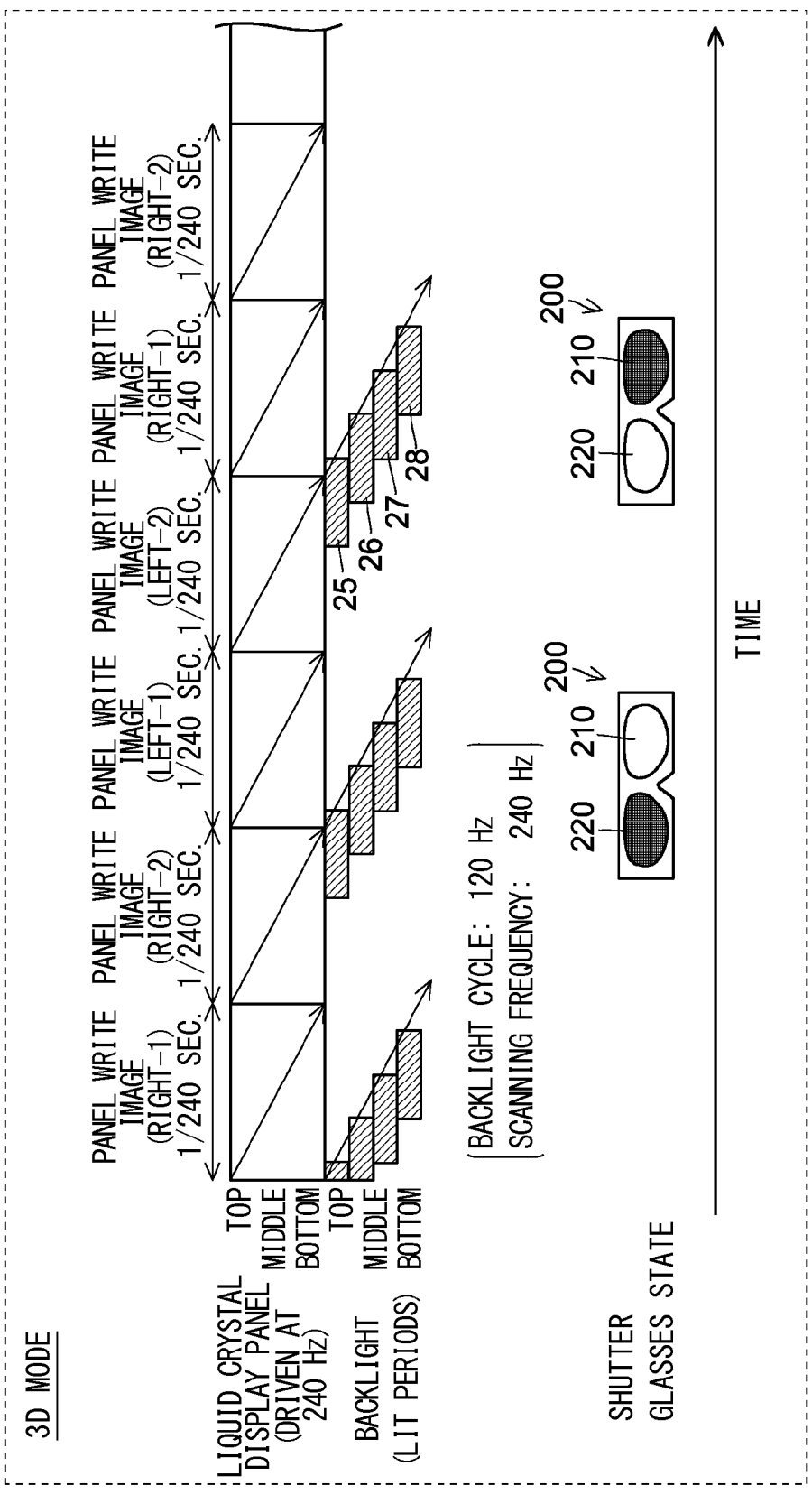
FIG. 5 is a diagram illustrating control operation (in a 3D mode) in a liquid crystal display device (television receiver) according to one embodiment of the invention.

In 240 Hz driving, each frame is written in 1/240 seconds (about 4 milliseconds). In the 3D mode, as one frame after another is displayed twice, right-eye and left-eye video are displayed alternately. Specifically, as shown in FIG. 5, right-eye video (panel write image (right-1)) is written in 1/240 seconds, then the same frame (panel write image (right-2)) is written in another 1/240 seconds, and thereby the right-eye video is retained. While the video is retained, the backlight 20 is scan-lit, and the right eye-side liquid crystal shutter 210 alone of the liquid crystal shutter glasses 200 is released so that the right-eye video is shown to the user's right eye.

Next, left-eye video (panel write image (left-1)) is written in 1/240 seconds, then the same frame (panel write image (left-2)) is written in another 1/240 seconds, and thereby the left-eye video is retained. Then, likewise, while the video is retained, the backlight 20 is scan-lit, and the left eye-side liquid crystal shutter 220 alone of the liquid crystal shutter glasses 200 is released so that the left-eye video is shown to the user's left eye. These operations are repeated, so that the user perceives a stereoscopic image (three-dimensional video).

Here, while video is written to the liquid crystal display panel 10 line-sequentially from the top tier (top) to the bottom tier (bottom), because of the rather slow response of liquid crystal, the right-eye and left-eye video may mix, for example, immediately after the write of panel write image (right-1). To prevent such mixed video from being viewed by the user, when panel write image (right-1) is written, the backlight 20 is kept extinguished. Then, at the time of the second write, that is, when panel write image (right-2) is written (during the period for which the video is retained), the backlight 20 is scan-lit. That is, as video is progressively displayed on the liquid crystal display panel 10, the backlight 20 is can-lit. This makes it possible to display the right-eye video alone.

The left-eye video is displayed in a similar manner. When panel write image (left-1) is written, the backlight 20 is kept extinguished; when panel write image (left-2) is written, the backlight 20 is scan-lit. This makes it possible to display the left-eye video alone. In this way, cross-talk (double vision resulting from the right-eye video entering the left eye, or the left-eye video entering the right eye) is effectively reduced.

By, in this way, setting the scanning frequency of the backlight 20 equal to that of the liquid crystal display panel 10, namely 240 Hz, and setting the backlight cycle at 120 Hz, it is possible to realize backlight scanning fit for the 3D mode, leading to improved display performance in the 3D mode.

The data (voltages) written to the pixels as described above is accumulated in the capacitances within the pixels, and the voltages are retained until the subsequent data is written. Due to leakage or the like, however, the capacitances may change, causing the retained voltages to vary. By writing each frame twice as described above, it is possible to suppress variations in voltages and keep more accurate voltages. Writing each frame twice also makes it possible to secure a long period for which the same image (video) is displayed from top to bottom in a single screen; thus, by lighting (scan-lighting) the backlight 20 during that period, it is possible to secure a long period for which the backlight 20 remains lit. This helps suppress a drop in luminance.

In the 3D mode, even though the liquid crystal display panel 10 is driven at 240 Hz, as a result of each frame being written twice, video is switched every 1/120 seconds (at 120 Hz).

On the other hand, when the 2D mode is selected, according to an instruction from the 2D/3D switching section 110 shown in FIG. 1, the scanning frequency of the liquid crystal display panel 10 is set at 120 Hz, and the liquid crystal display panel 10 is driven at 120 Hz. Simultaneously, the timing control section 180 controls the backlight driving section 30 such that the backlight driving section 30 scan-lights the backlight 20 at a scanning frequency of 120 Hz.

Figure 6:
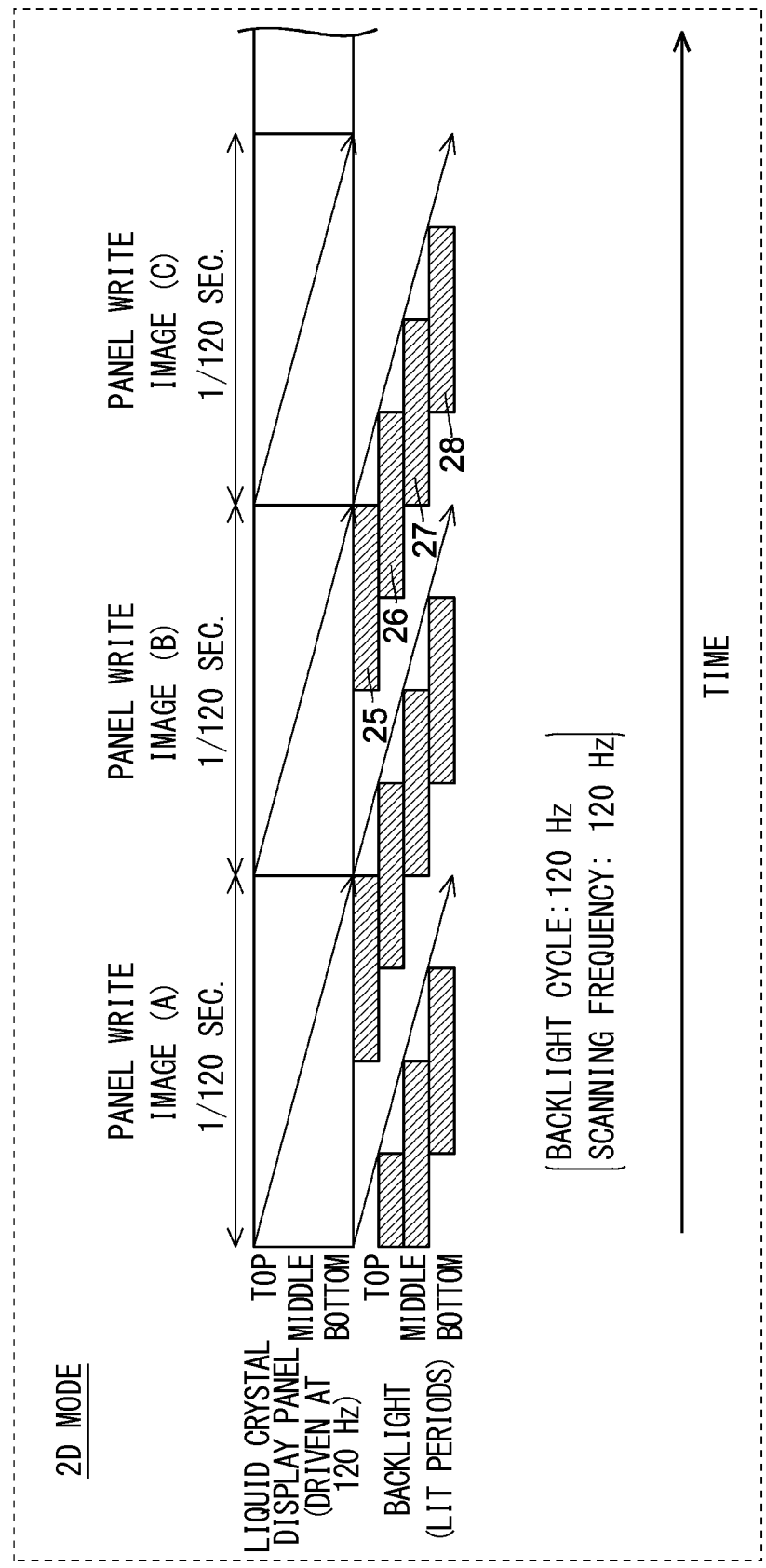
FIG. 6 is a diagram illustrating control operation (in a 2D mode) in a liquid crystal display device (television receiver) according to one embodiment of the invention.

In 120 Hz driving, each frame is written in 1/120 seconds (about 8 milliseconds). Specifically, as shown in FIG. 6, panel write image (A) is written in 1/120 seconds, then panel write image (B) is written in the subsequent 1/120 seconds, and then panel write image (C) is written in the further subsequent 1/120 seconds. That is, 120 frames are written in one second.

Television video as transmitted from a broadcast station generally has 60 frames per second (60 Hz), and thus video transmitted in one second contains 60 frames. Accordingly, in the 2D mode, display is achieved by displaying, between every two of the 60 frames per second of real video, an interpolating frame synthesized by a video processor (the image processing section 120) or the like. Thus, for example, panel write image (B), which comes between panel write images (A) and (C), is an interpolating frame.

In the 2D mode, in a manner coordinated with (in synchronism with) the scanning of the liquid crystal display panel 10, the backlight 20 is scan-lit.

By, in this way, setting the scanning frequency of the backlight 20 equal to that of the liquid crystal display panel 10, namely 120 Hz, it is possible to realize backlight scanning fit for the 2D mode, leading to improved display performance in the 2D mode. Moreover, in the 2D mode, by driving the liquid crystal display panel 10 at 120 Hz (double-speed driving), it is possible to realize clean video display without producing a sense of an afterimage. Furthermore, by scan-lighting the backlight 20 in a manner coordinated with (in synchronism with) the scanning of the liquid crystal display panel 10, it is possible to improve movie display performance.

Figure 7:
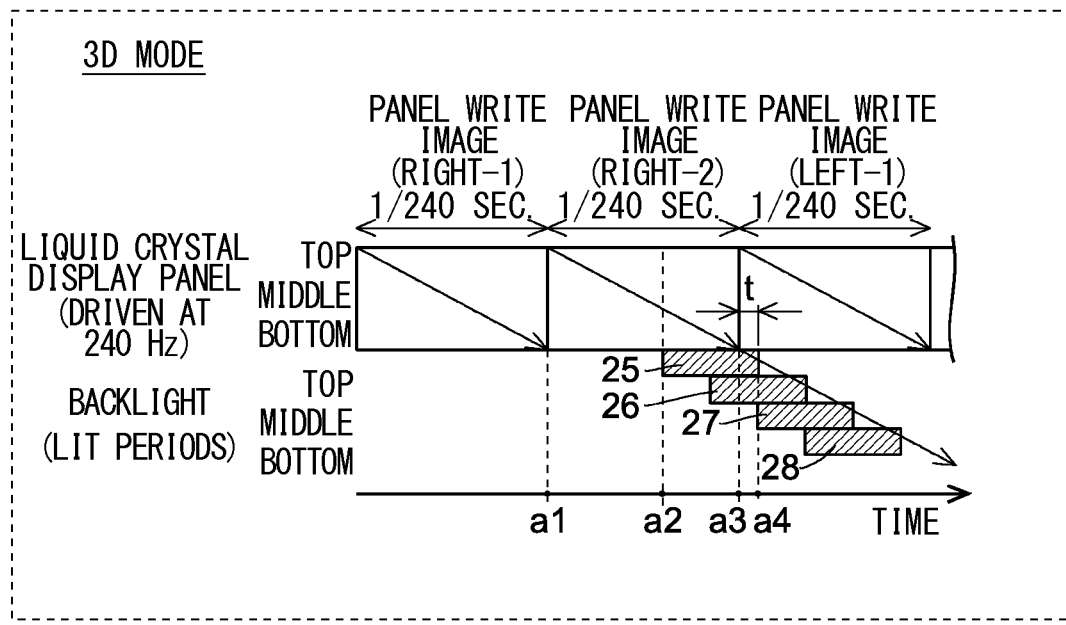
FIG. 7 is a diagram illustrating control operation in a liquid crystal display device (television receiver) according to one embodiment of the invention (an enlarged view of part of FIG. 5)

Now, with reference to FIGS. 1, 3, and 7 to 10, the scan-lighting of the backlight (backlight scanning) in the 3D and 2D modes will be described in more detail. In FIG. 7 (FIG. 5) and FIG. 8 (FIG. 6), the vertical axis represents the vertical position (top-middle-bottom) on the liquid crystal display device and the backlight.

As shown in FIG. 7, in the 3D mode, the liquid crystal display panel 10 (see FIG. 1) is driven at 240 Hz; accordingly, first, the video on the panel is overwritten with, for example, panel write image (right-1) in 1/240 seconds, and in the subsequent 1/240 seconds, this video is retained (the same frame, that is, panel write image (right-2), is written). Thus, it is possible even to start scan-lighting the backlight 20 at the start (at time point a1) of the write of panel write image (right-2) that retains the video.

Inconveniently, however, when the scan-lighting of the backlight 20 is started at the start of the write of panel write image (right-2 or left-2) (immediately after the completion of the write of panel write image (right-1 or left-1)), due to a delay in the response of liquid crystal itself or the like, a little cross-talk may occur. In this case, shortening the period for which the liquid crystal shutters of the liquid crystal glasses are kept released does reduce cross-talk, but the resulting shorter release period of the liquid crystal shutters makes flicker noticeable.

As a solution, in the embodiment, the scan-lighting of the backlight 20 is started in the middle of the second write (for example, in the middle of the write of panel write image (right-2 or left-2)). Specifically, the scan-lighting of the backlight 20 is started at time point a2. The backlight 20 is lit starting with the first illumination region 25; thus, at time point a2, the first illumination region 25 of the backlight 20 is lit, followed by the second, third, and fourth illumination regions 26, 27, and 28 being lit sequentially.

Here, in this embodiment, settings are made such that the illumination regions 25 to 28 of the backlight 20 are extinguished at time points slightly shifted from the write of the next frame (in the corresponding part).

For example, with regard to the first illumination region 25, for instance, settings are made such that the first illumination region 25 of the backlight 20 is extinguished not simultaneously (at time point a3) with the completion of the write of panel write image (right-2 or left-2) but at a time point (time point a4) shifted from the write of panel write image (left-1 or right-1).

More specifically, in the top-tier part of the liquid crystal display panel 10 corresponding to the first illumination region 25 (the top-tier part of panel write image (left-1)), a write is started at time point a3 but, due to a delay in the response of liquid crystal or the like, for a predetermined period from the start of the write, the existing image (video) is not actually overwritten (the previous video is retained). Thus, until the image in that part is overwritten, the first illumination region 25 is kept lit. That is, in the 3D mode, the timing of extinction of the backlight 20 is shifted from the write of the next frame (in the corresponding part), and thus involves an extinction timing shift t. The same discussion as with the first illumination region 25 applies to the other illumination regions 26 to 28.

Shifting the extinction timing of the backlight 20 makes it possible to secure a long period for which the backlight 20 remains lit, and this, too, helps suppress a drop in luminance in the 3D mode.

Figure 8:
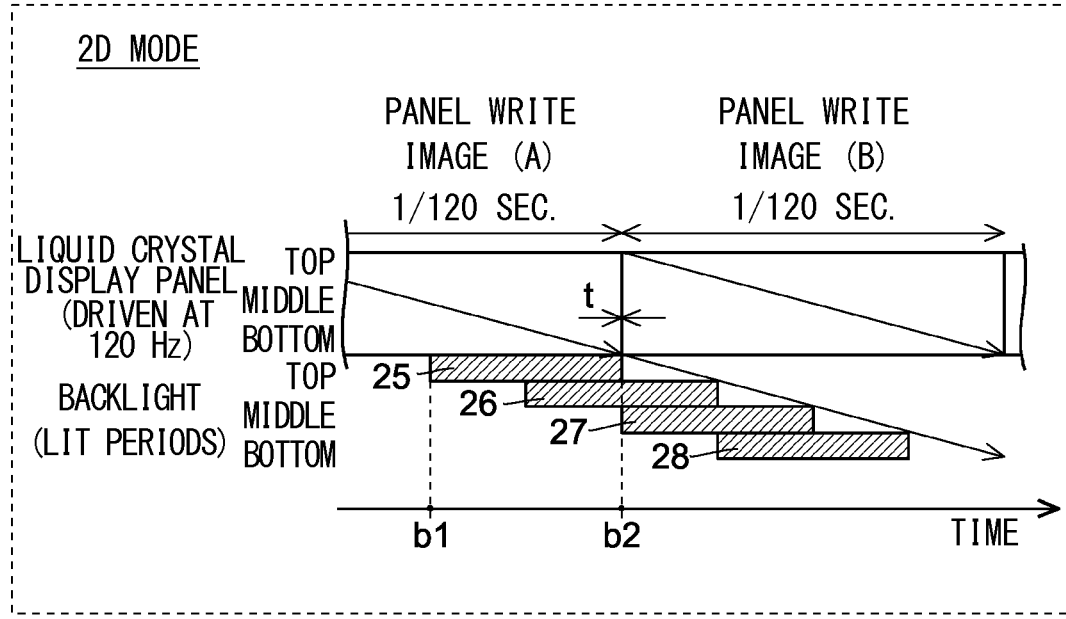
FIG. 8 is a diagram illustrating control operation in a liquid crystal display device (television receiver) according to one embodiment of the invention (an enlarged view of part of FIG. 6)

In the 2D mode, as shown in FIG. 8, as video is progressively displayed on the liquid crystal display panel 10, the backlight 20 is scan-lit. Specifically, settings are made such that video (for example, panel write image (A)) is written to the liquid crystal display panel 10 sequentially from top to bottom, and as the video is progressively displayed on the liquid crystal display panel 10, the illumination regions 25 to 28 of the backlight 20 are lit sequentially.

In the 2D mode, unlike in the 3D mode, settings are made such that the illumination regions 25 to 28 of the backlight 20 are extinguished approximately with the same timing as the write of the next frame (in the corresponding part).

Likewise, with regard to the first illumination region 25, for instance, settings are made, for example, such that the first illumination region 25 starts being lit at time point b1 and is extinguished approximately at the same time (at time point b2) as the completion of the write of a panel write image (for example, panel write image (A)).

That is, in the 2D mode, the extinction timing shift t is almost zero, and is thus smaller than in the 3D mode. This helps improve display performance in the 2D mode as well.

As described above, in this embodiment, the extinction time point (lighting end time point) in the scan-lighting of the backlight 20 differs in the 3D and 2D modes, hence with extinction time points fit for the respective modes.

Figure 9:
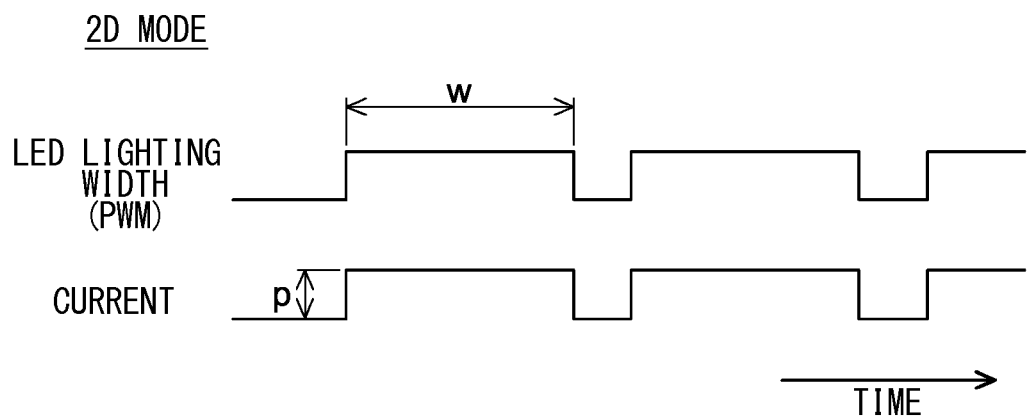
FIG. 9 is a diagram illustrating control operation in a liquid crystal display device (television receiver) according to one embodiment of the invention (a diagram illustrating the lighting width of, and electric current to, LEDs in a 2D mode)
Figure 10:
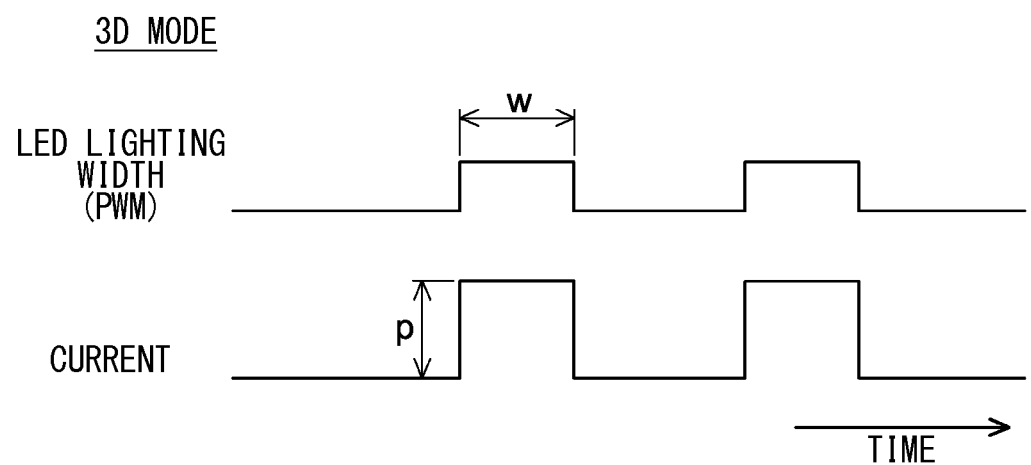
FIG. 10 is a diagram illustrating control operation in a liquid crystal display device (television receiver) according to one embodiment of the invention (a diagram illustrating the lighting width of, and electric current to, LEDs in a 3D mode)

Moreover, in this embodiment, as shown in FIGS. 9 and 10, the lighting width w of the LEDs 22b (see FIG. 3) in the backlight 20 differs in the 2D and 3D modes. Specifically, the lighting width w of the LEDs 22b is smaller in the 3D mode than in the 2D mode, the lighting width w of the LEDs 22b in the 3D mode being about one-half of the lighting width w of the LEDs 22b in the 2D mode. More specifically, the lighting width w of the LEDs 22b in the 2D mode is, for example, 80%, and the lighting width w of the LEDs 22b in the 3D mode is, for example, 40%. In the 2D mode, the lighting width w of the LEDs 22b can be set at up to 100%, and in the 3D mode, the lighting width w of the LEDs 22b can be set at up to about 50%.

On the other hand, in the 3D mode, the smaller lighting width w of the LEDs 22b than in the 2D mode is made up for by a higher amount of electric current (current value p) supplied to the LED 22b. For example, in the 3D mode, the amount of current (the value p of the current) supplied to the LEDs 22b is twice as large as in the 2D mode. Thus, also in the 3D mode, it is possible to suppress a drop in illuminance and obtain bright video.

Figure 11:
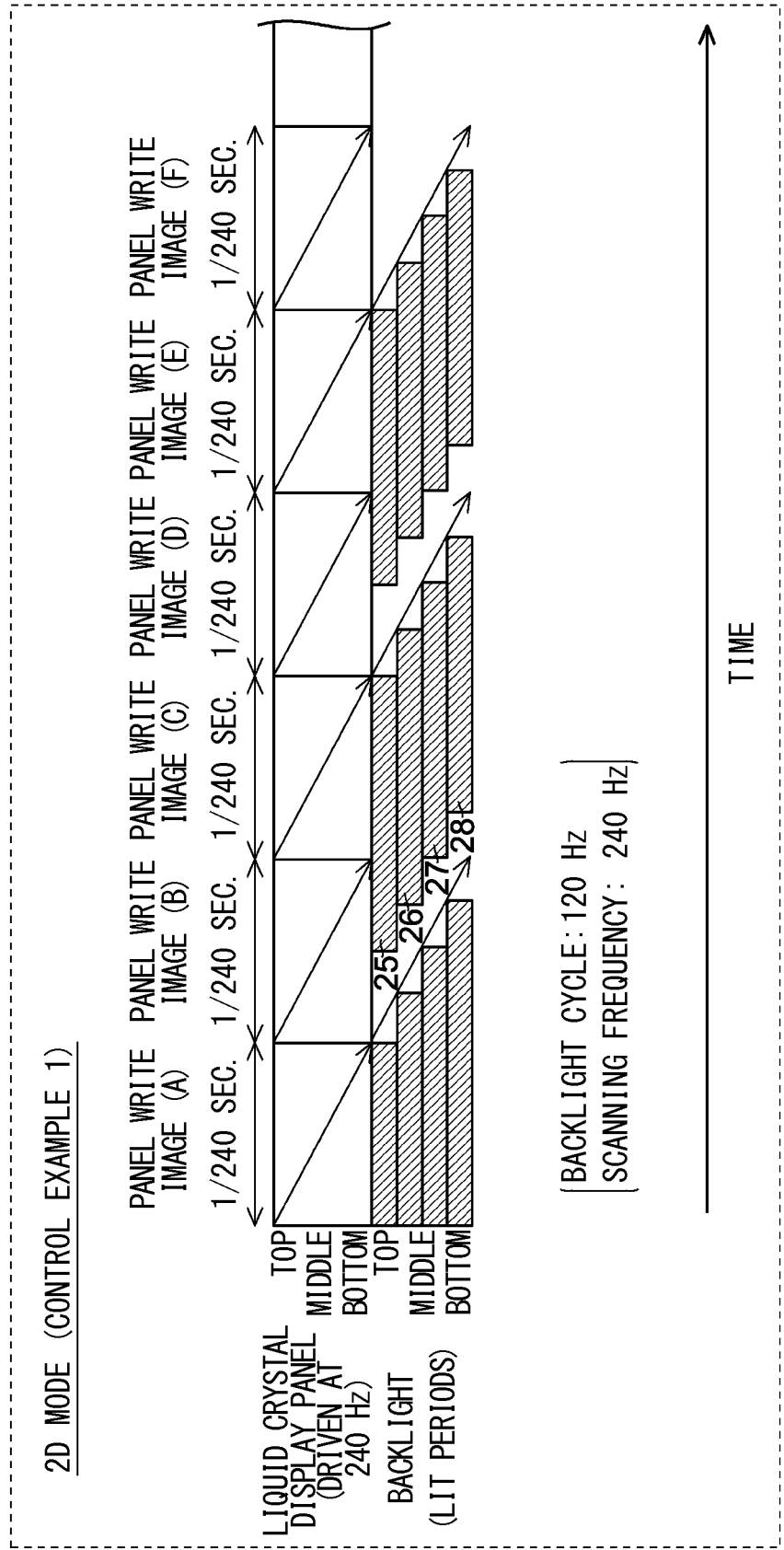
FIG. 11 is a diagram illustrating control operation in a 2D mode in Control Example 1.
Figure 12:
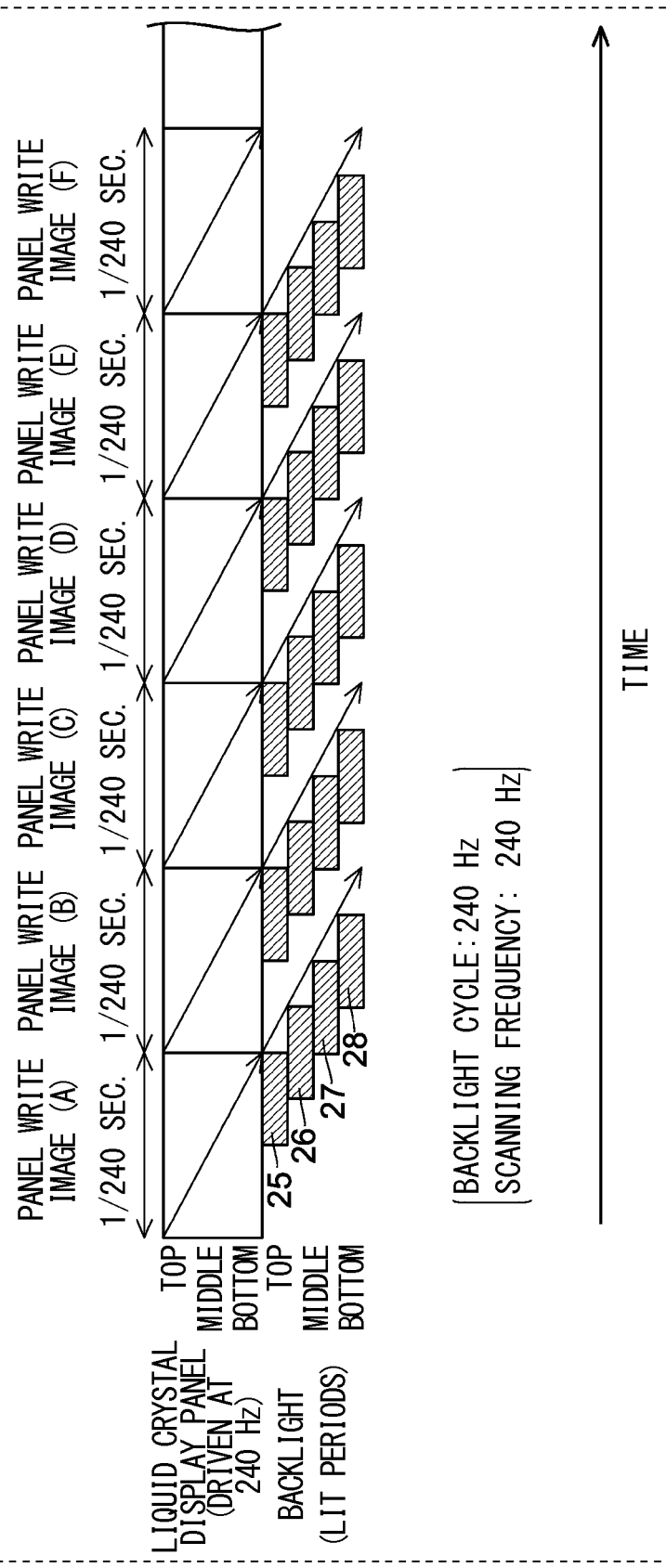
FIG. 12 is a diagram illustrating control operation in a 2D mode in Control Example 2.

FIG. 11 is a diagram illustrating the control operation in the 2D mode in Control Example 1, and FIG. 12 is a diagram illustrating the control operation in the 2D mode in Control Example 2.

To enable display both in a 2D mode for displaying two-dimensional video and in a 3D mode for displaying three-dimensional video, it is also possible, unlike in the embodiment described above, to drive the liquid crystal display panel 10 at 240 Hz in the 2D mode, that is, at the same rate as in the 3D mode.

In a case where the liquid crystal display panel 10 is driven at 240 Hz also in the 2D mode, 240 frames are displayed in a second, that is, more frames are displayed in a second than in 120 Hz driving (120 frames per second). This is expected to lead to a further reduced sense of an afterimage.

Specifically, the control operation then proceeds as follows. In a case where the liquid crystal display panel 10 is driven at 240 Hz in the 2D mode, as shown in FIGS. 11 and 12, for example, panel write images (A) to (F) are overwritten every 1/240 seconds. In this case, the scanning frequency of the backlight 20 is the same as for display in the 3D mode, namely 240 Hz, in both Control Examples 1 and 2. The backlight cycle may be set at 120 Hz as in Control Example 1 shown in FIG. 11 or at 240 Hz as in Control Example 2 shown in FIG. 12.

Here, since television video as transmitted from a broadcast station generally has 60 frames per second (60 Hz) as mentioned above, video transmitted in one second contains 60 frames. Accordingly, in Control Examples 1 and 2, display is achieved by displaying, between every two of the 60 frames per second of real video, three interpolating frames synthesized by a video processor or the like. For example, panel write images (B), (C), and (D), which come between panel write images (A) and (E), are interpolating frames.

An interpolating frame is synthesized by predicting an intermediary frame based on the motions and the like previously recognized in video. An incorrect prediction will be perceived as noise in the resulting video. Thus, as the number of interpolating frames inserted in real video increases, the quality of the interpolating frames lowers, making noise noticeable. That is, a configuration involving inserting three interpolating frames at a time in real video as in Control Examples 1 and 2 may suffer from noticeable noise.

Moreover, in a case where the liquid crystal display panel 10 is driven at 240 Hz, video is overwritten every 1/240 seconds, and thus a delay in the response of liquid crystal tends to occur. A delay in the response of liquid crystal may cause blurred display.

By contrast, in the embodiment described above, only one interpolating frame is inserted at a time in real video, and this reduces noise compared with a case where three interpolating frames are inserted. Moreover, in the embodiment described above, video is overwritten at a lower rate than in Control Examples 1 and 2, namely every 1/120 seconds, and this suppresses a delay in the response of liquid crystal. Thus, it is possible to suppress blurring of the display resulting from a delay in the response of liquid crystal.

In this embodiment, as described above, by adopting a configuration where the scanning frequency of the backlight 20 differs between when two-dimensional video is displayed on the liquid crystal display panel 10 (in the 2D mode) and when three-dimensional video is displayed there (in the 3D mode), it is possible to scan-light the backlight 20 at scanning frequencies fit for display of two-dimensional and three-dimensional video respectively. Thus, it is possible to scan-light the backlight 20 at a scanning frequency fit for display of two-dimensional video when two-dimensional video is displayed, and to scan-light the backlight 20 at a scanning frequency fit for display of three-dimensional video when three-dimensional video is displayed. In this way, it is possible to improve display performance in either case.

In this embodiment, by adopting a configuration where the scanning frequency of the liquid crystal display panel 10 differs between when two-dimensional video is displayed and when three-dimensional video is displayed, it is possible to scan the liquid crystal display panel 10 at a scanning frequency fit for display of two-dimensional video when two-dimensional video is displayed, and to scan the liquid crystal display panel 10 at a scanning frequency fit for display of three-dimensional video when three-dimensional video is displayed. In this way, it is possible to further improve display performance in either case.

In this embodiment, by adopting a configuration where the extinction time point in the scan-lighting of the backlight 20 differs between when two-dimensional video is displayed and when three-dimensional video is displayed, it is easy to scan-light the backlight 20 in ways fit for display of two-dimensional and three-dimensional video respectively.

As described above, a preferred scanning frequency of the liquid crystal display panel 10 for display of three-dimensional video (in the 3D mode) is 240 Hz, and in this case a preferred scanning frequency of the backlight 20 also is 240 Hz. A preferred scanning frequency of the liquid crystal display panel 10 for display of two-dimensional video (in the 2D mode) is 120 Hz, and in this case a preferred scanning frequency of the backlight 20 also is 120 Hz.

In this embodiment, LEDs 22$b$ are used as the light source of the backlight 20. Since the LEDs 22$b$ have a fast light emission response as well as a fast light extinction response, by scan-lighting (turning on and off) the backlight 20 as video is progressively displayed on the liquid crystal display panel 10, it is possible to effectively improve display performance. For example, in the 3D mode, it is possible to effectively reduce cross-talk; in the 2D mode, it is possible to improve movie display performance.

In this embodiment, by making the lighting width of the LEDs 22$b$ shorter when three-dimensional video is displayed than when two-dimensional video is displayed, and making the value of the current supplied to the LEDs 22$b$ greater when three-dimensional video is displayed than when two-dimensional video is displayed, it is possible to suppress a drop in luminance in the display of both two-dimensional and three-dimensional video.

By temporarily extinguishing the backlight 20 during switching between display of two-dimensional and three-dimensional video, it is possible to perform a safe lighting sequence.

As described above, in this embodiment, when two-dimensional video is displayed (in the 2D mode), by scan-lighting the backlight 20 at a scanning frequency (backlight cycle) fit for display of two-dimensional video, it is possible to display bright, clean two-dimensional video. When three-dimensional video is displayed (in the 3D mode), by scan-lighting the backlight 20 at a scanning frequency (backlight cycle) fit for display of three-dimensional video, it is possible to reduce cross-talk, and also to suppress a drop in luminance. It is thus possible to display clear three-dimensional video without blur.

Thus, with the configuration described above, it is possible to improve display performance in display of both two-dimensional and three-dimensional video, and thereby to provide a liquid crystal display device and a television receiver that offer clean, comfortable display.

It should be understood that the embodiment disclosed herein is in every aspect illustrative and not restrictive. The scope of the present invention is defined not by the description of the embodiment presented above but by the appended claims, and encompasses all variations and modifications made within the spirit and scope equivalent to those of the claims.

Figure 13:
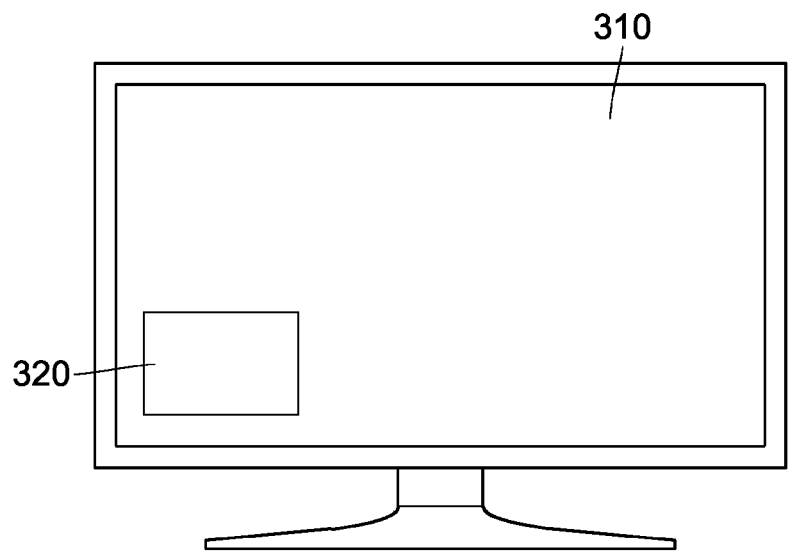
FIG. 13 is a front view of a liquid crystal display device (television receiver) according to a modified example of the invention.

For example, although the embodiment presented above deals with an example of a configuration where switching between two-dimensional video and three-dimensional video is made so that one of them is selectively displayed, this is not meant to limit the invention; a configuration may be adopted where two-dimensional video and three-dimensional video are displayed simultaneously. For example, as shown in FIG. 13, a sub screen 320 may be displayed in part of the screen 310 of a liquid crystal display panel, with two-dimensional (three-dimensional) video displayed in the screen 310 and three-dimensional (two-dimensional) video displayed in the sub screen 320. In that case, for example, a backlight that allows area-by-area control (local dimming control) is used, and the backlight is scan-lit at different scanning frequencies in the areas of the screen 310 and the sub screen 320 respectively. The scanning frequency (driving frequency) of the liquid crystal display panel can be varied between the areas of the screen 310 and the sub screen 320, for example, by using separate image processing engines.

Although the embodiment presented above deals with an example where a backlight of an edge-lit type is used as the backlight, this is not meant to limit the invention; a backlight of any type other than an edge-lit type may instead be used so long as it can be scan-lit. For example, a backlight of a direct-lit type may be used.

Although the embodiment presented above deals with an example where LEDs are used as the light source of the backlight, the light source of the backlight may be other than LEDs. CCLFs (cold-cathode fluorescent lamps) may be used as the light source, but LEDs are preferable for their faster light emission and extinction responses and other advantages.

Although the embodiment presented above deals with an example where the liquid crystal display device includes a backlight driving section, this is not meant to limit the invention; the liquid crystal display device may instead be configured to include no backlight driving section. The liquid crystal display device may also be configured so as to include another circuit such as the 2D/3D switching section (for example, at least part of the 2D/3D switching section, image processing section, digital gamma correction section, overdrive section, analog gamma correction section, look-up tables, timing control section, backlight driving section, and shutter glasses driving section).

Although the embodiment presented above deals with an example of a television receiver that can receive television video transmitted from a broadcast station, this is not meant to limit the invention; the invention can be applied to monitors (liquid crystal display devices) without a function of receiving television video. Television video includes video transmitted across the Internet and from a cable television station.

Figure 14:
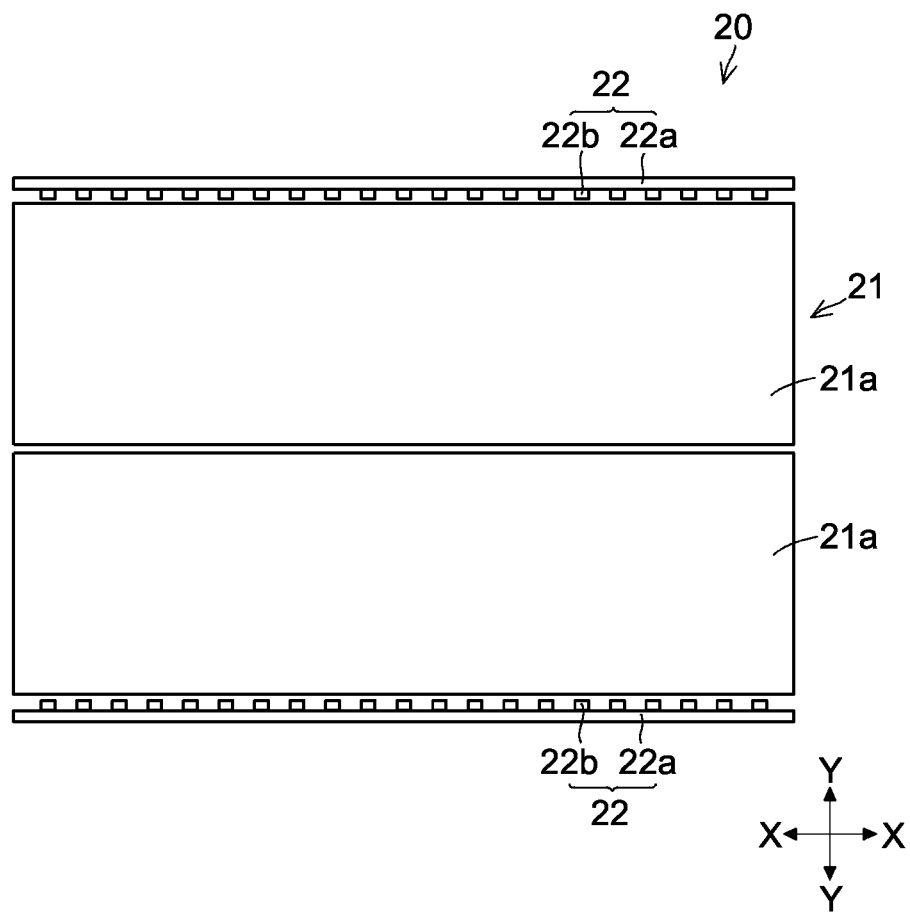
FIG. 14 is a plan view showing a backlight (LEDs and a light guide member) according to a modified example of the invention.

Although the embodiment presented above deals with an example where the illumination region of the backlight is divided into four parts (four illumination regions), this is not meant to limit the invention; the illumination region of the backlight may be divided into a plurality of, other than four, illumination regions in the up/down direction. The illumination region of the backlight has only to be divided into at least two parts in the up/down direction. For example, as shown in FIG. 14, it is possible to use a backlight 20 in which the light guide member 21 is composed of two light guide segments 21a and these are arranged in the up/down direction (Y direction). In that case, the LED modules 22 may be arranged in two rows, one at each side of the backlight 20 in the up/down direction (Y direction). To effectively reduce cross-talk, it is preferable that the illumination region of the backlight be divided in more than two regions in the up/down direction. The illumination region of the backlight may even be divided in the left/right direction.

Although the embodiment presented above deals with an example where a plurality of LEDs (LED modules) are arranged in two columns, one at each side of the backlight in the left/right direction (X direction), this is not meant to limit the invention; LEDs may instead be arranged only at one side in the left/right direction.

The light guide member of the backlight may be composed of, instead of a plurality of light guide segments, a single light guide member having grooves formed on it so as to have optically separated illumination regions. It is possible, even without forming grooves in a single light guide member, to achieve scan lighting by controlling the lighting of a plurality of light sources.

Although the embodiment presented above deals with an example where the liquid crystal display panel is driven at 240 Hz in the 3D mode and at 120 Hz in the 2D mode, it can be driven at a frequency other than those just mentioned depending on the response speed of liquid crystal and the quality of interpolating frames. In such cases, the scanning frequency of the backlight is changed to suit the driving frequency or the like of the liquid crystal display panel. The scanning frequency of the backlight still differs in the 2D and 3D modes.

Although the embodiment presented above deals with an example where settings are made such that the extinction timing of the backlight differs in the 2D and 3D modes, this is not meant to limit the invention; settings may instead be made such that the extinction timing of the backlight is the same in the 2D and 3D modes. It is, however, preferable that, as in the embodiment presented above, settings be made such that the extinction timing of the backlight differs in the 2D and 3D modes. The extinction timing of the backlight can be different from those in the embodiment presented above depending on the response speed of liquid crystal etc.

As an example of a 2D mode having different timing from that in the embodiment presented above, a mode is possible in which the scanning frequency of the backlight is infinitely great, that is, no scanning is performed but all the illumination regions start and stop being lit simultaneously.

In the embodiment presented above, there is no particular restriction on the type of LEDs. For example, it is possible to use LEDs that include an LED chip (light emitting chip) emitting blue light and a phosphor (fluorescent or phosphorescent substance or member) giving off yellow light by fluorescence when receiving the light from the LED chip. These LEDs produce white light by mixing the light from the LED chip emitting blue light and the light resulting from fluorescence. There is no particular restriction on the number of LED chips included in the LEDs.

The phosphor included in the LEDs is not limited to one that gives off yellow light by fluorescence. LEDs may instead include an LED chip emitting blue light and phosphors that give off green and red light by fluorescence when receiving the light from the LED chip, so as to produce white light by mixing the blue light from the LED chip and the light (green and red light) resulting from fluorescence.

The LED chip included in the LEDs is not limited to one that emits blue light. For example, the LEDs may instead include a red LED chip emitting red light, a blue LED chip emitting blue light, and a phosphor giving off green light by fluorescence when receiving the light from the blue LED chip. These LEDs produce white light by mixing the red light from the red LED chip, the blue light from the blue LED chip, and the green light resulting from fluorescence.

The LEDs may even be LEDs that include no phosphor at all. For example, the LEDs may include a red LED chip emitting red light, a green LED chip emitting green light, and a blue LED chip emitting blue light, so as to produce white light by mixing the light from all those LED chips.

LIST OF REFERENCE SIGNS 10 liquid crystal display panel
11 data line
12 gate line
13 data driver
14 gate driver
20 backlight (illuminating device)
21 light guide member
21a light guide segment
22 LED module
22a mounting board
22b LED (light source)
25 first illumination region
26 second illumination region
27 third illumination region
28 fourth illumination region
30 backlight driving section
110 2D/3D switching section
120 image processing section
130, 140 look-up table (LUT)
150 digital gamma correction section 160 overdrive circuit
170 analog gamma correction section
180 timing control section
190 shutter glasses driving section
200 liquid crystal shutter glasses
210, 220 liquid crystal shutter

The invention claimed is:

1. A liquid crystal display device comprising:
a liquid crystal display panel which switches between two-dimensional video and three-dimensional video to selectively display one of the two-dimensional and three-dimensional video; and
an illuminating device which supplies light to the liquid crystal display panel,
wherein
the illuminating device includes illumination regions that are scan-lit as the liquid crystal display panel is scanned,
a scanning frequency of the illuminating device differs between when the two-dimensional video is displayed on the liquid crystal display panel and when the three-dimensional video is displayed on the liquid crystal display panel, and
a lighting cycle of the illuminating device is equal between when the two-dimensional video is displayed and when the three-dimensional video is displayed.

2. The liquid crystal display device according to claim 1, wherein a scanning frequency of the liquid crystal display panel differs between when the two-dimensional video is displayed and when the three-dimensional video is displayed.

3. The liquid crystal display device according to claim 1, wherein a lighting end time point in scan-lighting of the illuminating device differs between when the two-dimensional video is displayed and when the three-dimensional video is displayed.

4. The liquid crystal display device according to claim 1, wherein
the illuminating device includes a plurality of light sources, and
lighting of the plurality of light sources is controlled individually and thereby the illumination regions are scan-lit as the liquid crystal display panel is scanned.

5. The liquid crystal display device according to claim 4, wherein the light sources are light emitting diodes.

6. The liquid crystal display device according to claim 5, wherein
lighting of the light emitting diodes is controlled by pulse width modulation control, and
a lighting width of the light emitting diodes differs between when the two-dimensional video is displayed on the liquid crystal display panel and when the three-dimensional video is displayed on the liquid crystal display panel.

7. The liquid crystal display device according to claim 5, wherein
a lighting width of the light emitting diodes is shorter when the three-dimensional video is displayed than when the two-dimensional video is displayed, and
a current value supplied to the light emitting diodes is greater when the three-dimensional video is displayed than when the two-dimensional video is displayed.

8. The liquid crystal display device according to claim 1, wherein
in each case of when the two-dimensional video is displayed and when the three-dimensional video is displayed,
a scanning frequency of the liquid crystal display panel and the scanning frequency of the illuminating device are equal.

9. The liquid crystal display device according to claim 1, wherein a scanning frequency of the liquid crystal display panel and the scanning frequency of the illuminating device are both 120 Hz when the two-dimensional video is displayed and 240 Hz when the three-dimensional video is displayed.

10. The liquid crystal display device according to claim 1, wherein
the illuminating device further includes a light guide member which guides light, and
the light guide member is divided into a plurality of regions at least in an up/down direction of the liquid crystal display panel.

11. The liquid crystal display device according to claim wherein the illuminating device is extinguished during switching between display of the two-dimensional video and display of the three-dimensional video.

12. A television receiver comprising the liquid crystal display device according to claim 1.

13. The liquid crystal display device according to claim 1, wherein a frequency of the lighting cycle is lower than the scanning frequency of the illuminating device when the three-dimensional video is displayed.

14. The liquid crystal display device according to claim 1, wherein a frequency of the lighting cycle is equal to the scanning frequency of the illuminating device when the two-dimensional video is displayed.

15. The liquid crystal display device according to claim 1, wherein a frequency of the lighting cycle equals 120 Hz.

16. The liquid crystal display device according to claim 1, wherein one of the illumination regions is extinguished, when the three-dimensional video is displayed, later than completion of a write of one frame and, when the two-dimensional video is displayed, approximately at a same time as completion of a write of one frame.

* * * * *